(12) United States Patent
Tuliani (10) Patent No.: US 7,882,553 B2
(45) Date of Patent: Feb. 1, 2011

(54) AUTHENTICATION DEVICE AND METHOD

(75) Inventor: Jonathan Roshan Tuliani, Cambridge (GB)

(73) Assignee: Cryptomathic A/S, Aarhus (DK)

( * ) Notice: Subject to any disclaimer, the term of this patent is extended or adjusted under 35 U.S.C. 154(b) by 341 days.

(21) Appl. No.: 11/682,773

(22) Filed: Mar. 6, 2007

(65) Prior Publication Data
US 2008/0201577 A1 Aug. 21, 2008

(30) Foreign Application Priority Data
Feb. 20, 2007 (GB) .................. 0703245.1

(51) Int. Cl.
G06F 7/04 (2006.01)
G06F 15/16 (2006.01)
G06F 17/30 (2006.01)
H04L 29/06 (2006.01)

(52) U.S. Cl. .................. 726/9; 713/184; 713/185; 713/169

(58) Field of Classification Search .................. 713/182, 713/184, 185, 169; 726/9
See application file for complete search history.

(56) References Cited

U.S. PATENT DOCUMENTS

| | | | |
|---|---|---|---|
| 6,434,700 B1 * | 8/2002 | Alonso et al. ................ 713/169 |
| 7,210,166 B2 * | 4/2007 | Davis et al. .................... 726/6 |
| 7,347,366 B2 * | 3/2008 | M'Raihi ...................... 235/382 |
| 7,565,297 B2 * | 7/2009 | Labaton ....................... 704/273 |
| 7,716,484 B1 * | 5/2010 | Kaliski, Jr. ................... 713/176 |
| 2005/0010758 A1 * | 1/2005 | Landrock et al. ............. 713/156 |
| 2005/0119978 A1 * | 6/2005 | Ates ............................. 705/67 |
| 2006/0018467 A1 * | 1/2006 | Steinmetz .................... 380/54 |
| 2006/0020559 A1 * | 1/2006 | Steinmetz .................... 705/67 |
| 2006/0085845 A1 * | 4/2006 | Davis et al. ..................... 726/6 |
| 2006/0219776 A1 * | 10/2006 | Finn ........................... 235/380 |
| 2006/0242698 A1 * | 10/2006 | Inskeep et al. ................. 726/20 |
| 2007/0022196 A1 * | 1/2007 | Agrawal ...................... 709/225 |
| 2007/0033642 A1 * | 2/2007 | Ganesan et al. ............... 726/10 |
| 2007/0101152 A1 * | 5/2007 | Mercredi et al. ............. 713/185 |

(Continued)

FOREIGN PATENT DOCUMENTS

EP 1075161 A2 2/2001

(Continued)

OTHER PUBLICATIONS

Tuliani, The Future of Phishing, 2004, Cryptomathic.*

(Continued)

Primary Examiner—David García Cervetti
(74) Attorney, Agent, or Firm—Knobbe, Martens, Olson & Bear, LLP.

(57) ABSTRACT

An apparatus for generating intermediate cryptogram data corresponding to a dynamic password for a first cryptographic scheme, the intermediate cryptogram data being suitable for display using a device designed for a second, different cryptographic scheme, the apparatus including: a communications interface for communicating with a said device; and a processor coupled to a memory, the memory storing processor control code to control the processor, when running, to: generate a dynamic password according to the first cryptographic scheme; and generate intermediate cryptogram data corresponding to said dynamic password, the intermediate cryptogram data being suitable for outputting to the said device so that, when the said device processes said intermediate cryptogram data according to the second cryptographic scheme, the said device generates data suitable for displaying said dynamic password.

21 Claims, 3 Drawing Sheets

U.S. PATENT DOCUMENTS

| | | | |
|---|---|---|---|
| 2007/0113294 A1* | 5/2007 | Field et al. | 726/27 |
| 2007/0130472 A1* | 6/2007 | Buer et al. | 713/182 |
| 2007/0174614 A1* | 7/2007 | Duane et al. | 713/168 |
| 2007/0215693 A1* | 9/2007 | M'Raihi | 235/380 |
| 2007/0250923 A1* | 10/2007 | M'Raihi | 726/18 |
| 2007/0260544 A1* | 11/2007 | Wankmueller | 705/44 |
| 2008/0014867 A1* | 1/2008 | Finn | 455/41.1 |
| 2008/0040285 A1* | 2/2008 | Wankmueller | 705/67 |
| 2008/0043952 A1* | 2/2008 | Citron et al. | 379/114.15 |
| 2008/0052524 A1* | 2/2008 | Cedar et al. | 713/184 |
| 2008/0098464 A1* | 4/2008 | Mizrah | 726/5 |
| 2008/0110983 A1* | 5/2008 | Ashfield | 235/382 |
| 2008/0114980 A1* | 5/2008 | Sridhar | 713/168 |
| 2008/0127321 A1* | 5/2008 | Vaeth | 726/9 |
| 2008/0154770 A1* | 6/2008 | Rutherford et al. | 705/44 |
| 2008/0301461 A1* | 12/2008 | Coulier et al. | 713/184 |
| 2009/0063345 A1* | 3/2009 | Erikson | 705/44 |
| 2009/0313687 A1* | 12/2009 | Popp et al. | 726/9 |

FOREIGN PATENT DOCUMENTS

| | | |
|---|---|---|
| EP | 1139200 A2 | 3/2001 |
| EP | 1107089 A1 | 6/2001 |
| EP | 1075161 A3 | 8/2001 |
| EP | 1139200 A3 | 10/2002 |
| EP | 1075161 B1 | 3/2004 |
| EP | 1775673 A2 | 4/2007 |
| GB | 2317983 A | 4/1998 |
| WO | WO 03/096287 A | 11/2003 |
| WO | WO 2006/116172 A1 | 11/2006 |

OTHER PUBLICATIONS

Willoughby, OATH Swears Authentication is the Next Big Thing, Jan./Feb. 2005, Digital ID World.*
Jun. 29, 2007 Search Report for UK Application GB0703245.1.
ISR and WO for PCT/GB2008/050100, dated Aug. 18, 2008.

* cited by examiner

AUTHENTICATION DEVICE AND METHOD

CLAIM OF PRIORITY

This application claims priority to United Kingdom Patent Application No. 0703245.1, filed Feb. 20, 2007, which is incorporated in its entirety by reference herein.

BACKGROUND OF THE INVENTION

1. Field of the Invention

This invention relates to an authentication device and method, in particular to devices and methods for generating dynamic passwords, and to cards carrying the device and to software implementing the method.

2. Description of the Related Art

Authentication of remote users is an essential part of many web- and network-based applications. Traditional usernames and passwords offer an inexpensive but weak solution. Higher security is often obtained by issuing users with a 'token'—a small, portable device—which generates apparently random passwords that are valid only for a single use: so-called one-time-passwords (OTPs). By presenting an OTP to the system the user demonstrates possession of the token, which when combined with a traditional static password provides strong, two-factor authentication.

A wide variety of tokens exists in the market, based primarily on proprietary, vendor-specific technology. For example, RSA SecureID, VASCO Digipass, Secure Computing and Active Identity. A standardisation effort is currently taking place within the token-vendor community, called the Initiative for Open Authentication (OATH) [http://www_openauthentication_org]. This seeks to promote standards for OTP-generating tokens and the infrastructure necessary for their deployment and use.

Figure 1:
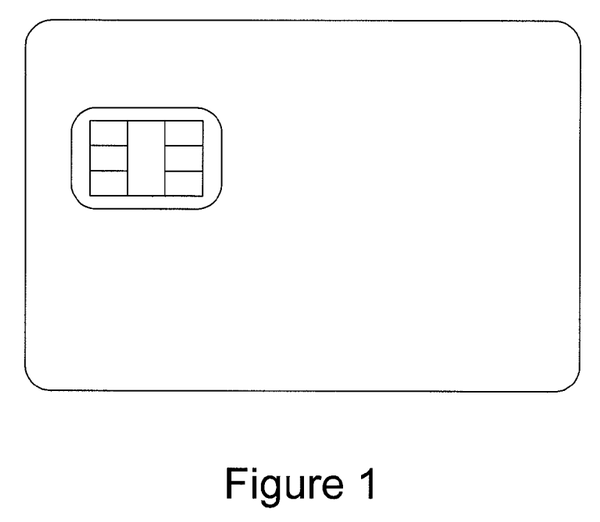
FIG. 1 schematically illustrates a standard 'Chip and PIN' payment card.
Figure 2:
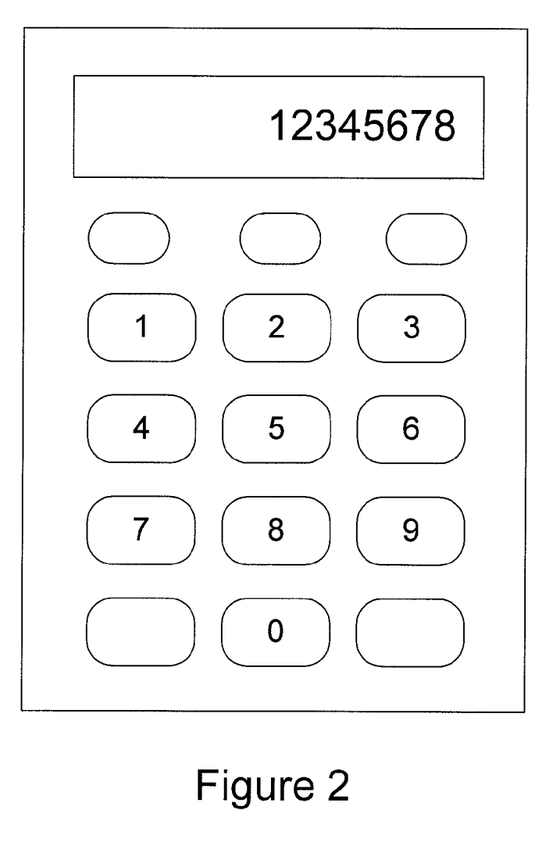
FIG. 2 schematically illustrates a standard hand-held card reader used to create OTPs based on the core functions within the card compatible with the Chip Authentication Program (CAP).

At the same time, the need for strong authentication in the financial sector has lead MasterCard to pioneer an alternative standard, based on a variant of the standard 'Chip and PIN' payment card (FIG. 1). In this scheme, called the Chip Authentication Program (CAP) [Chip Authentication Program Function Architecture, MasterCard International, September 2004], a hand-held card reader (FIG. 2) is used to create OTPs based on the core functions within the card. The card readers are anonymous and interchangeable, and the concept calls for widespread deployment to make them commonplace items in every household or office, thus removing the need for individual users to carry their card reader on their person.

However, CAP is a closed, proprietary system and is not compatible with other systems. In the future, CAP-compatible card readers may become widely available, but they will only be useful with CAP-compatible Chip and PIN cards in applications approved by their issuing banks, since only the issuing bank has access to the information needed to verify an OTP generated by the card.

SUMMARY OF THE INVENTION

We will describe a means of exploiting standard CAP card readers together with a custom, non-payment card to generate OATH-compatible OTPs. An advantage of this approach is that standard OATH infrastructure can be used for the deployment of the cards and validation of the resulting OTPs, whilst the cost of tokens is reduced to the cost of a chip-card, by exploiting the deployed card reader base. More generally, we will describe algorithm substitution in card and reader based one-time-password devices. Cards may be provided to work with, for example, RSA SecureID, VASCO DigiPass, Secure Computing or ActivIdentity schemes instead of or as well as OATH.

We will describe an integrated circuit for generating a dynamic password for a first cryptographic scheme, the circuit being suitable for use with a device designed for a second, different cryptographic scheme, the circuit comprising: a power supply input for supplying power to the integrated circuit; an interface for transmitting data to and receiving data from the integrated circuit; and a processor coupled to a memory, the memory storing processor control code to control the processor, when running, to generate a dynamic password according to the first cryptographic scheme and then to produce intermediate cryptogram data suitable for outputting to the said device such that the processing performed by the device according to the second cryptographic scheme results in the device generating the original dynamic password according to the first cryptographic scheme.

We will describe a method of outputting pseudo-cryptogram data corresponding to a dynamic password according to a first cryptographic scheme, the data being suitable for output to a device designed for a second, different cryptographic scheme, the method comprising generating the dynamic password according to the first cryptographic scheme and then generating intermediate cryptogram data by the reverse of the processing performed by the device according to the second cryptographic scheme and outputting said intermediate cryptogram data, such that the device on processing the data generates the original dynamic password according to the first cryptographic scheme.

According to an aspect of the present invention, there is provided an apparatus for generating intermediate cryptogram data corresponding to a password for a first cryptographic scheme, the apparatus being suitable for use with a device designed for a second, different cryptographic scheme, the apparatus comprising: a communications interface for communicating with a said device; and a processor coupled to a memory, the memory storing processor control code to control the processor, when running, to: generate a password according to the first cryptographic scheme; and generate intermediate cryptogram data corresponding to said password, the intermediate cryptogram data being suitable for outputting to the said device so that, when the said device processes said intermediate cryptogram data according to the second cryptographic scheme, the said device generates said password.

Preferably the password comprises a dynamic password, or a password which is generated by including bits from a binary counter or clock into the cryptogram calculation, and in the case that a counter is used incrementing the counter each time a password is generated.

On occasion the dynamic password of the first cryptographic scheme may be incompatible with the device of the second cryptographic scheme, and code to generate a dynamic password may comprise code to generate dynamic passwords repeatedly until a dynamic password is found which is compatible with the second cryptographic scheme.

This incompatibility may be caused by leading zeros occurring in certain dynamic passwords of the first cryptographic scheme, which may be incompatible with the device of the second cryptographic scheme.

Alternatively the incompatibility may be caused by a check digit automatically generated by said device which is incompatible with certain dynamic passwords of the first cryptographic scheme.

According to another aspect of the present invention, there is provided a method of generating intermediate cryptogram data corresponding to a cryptogram according to a first cryptographic scheme, the data being suitable for display on a device designed for a second, different cryptographic scheme, the method comprising: generating a dynamic password according to the first cryptographic scheme; and generate intermediate cryptogram data corresponding to said dynamic password, said intermediate cryptogram data being suitable for outputting to a said device so that, when the said device processes said intermediate cryptogram data according to the second cryptographic scheme, the said device outputs said dynamic password.

Certain embodiments of the invention further provide processor control code to implement the above-described methods, for example on a general purpose computer system or on a digital signal processor (DSP), or on a dedicated integrated circuit, for example a smart card. The code may be provided on a carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code. The above described methods may also be implemented, for example, on an FPGA (field programmable gate array) or in an ASIC (application specific integrated circuit). Thus the code may also comprise code for setting up or controlling an ASIC or FPGA, or code for a hardware description language such as Verilog (Trade Mark), VHDL (Very high speed integrated circuit Hardware Description Language), or RTL code or SystemC. Typically dedicated hardware is described using code such as RTL (register transfer level code) or, at a higher level, using a language such as C. As the skilled person will appreciate such code and/or data may be distributed between a plurality of coupled components in communication with one another.

Features of the above described aspects and embodiments of the invention may be combined in any permutation.

BRIEF DESCRIPTION OF THE DRAWINGS

Embodiments of these and other aspects of the invention will now be described in detail with reference to the accompanying drawings, in which.

DETAILED DESCRIPTION OF THE PREFERRED EMBODIMENT

We will first describe the MasterCard Chip Authentication Program.

Chip and PIN Cards

'Chip and PIN' cards follow technical standards more formally known as EMV, after Europay, MasterCard and Visa. They are being widely adopted in many countries worldwide, as they offer powerful security features allowing card issuers to control various forms of fraud.

A chip embedded in each EMV card is used to authorise transactions. The authorisation is based on a cryptogram computed using a key unique to the card, together with details of the transaction. The key is embedded into the chip during the issuing process, and a copy retained securely by the issuing bank. The chip also maintains a counter value, known as the Application Transaction Counter (ATC), which is included in the cryptogram computation and incremented with each transaction, as a defense against replay attacks. Finally, the cardholder supplies a PIN, which the chip verifies against a stored reference value, before allowing the cryptogram to be computed.

On receiving a transaction, the issuer is able to re-compute the cryptogram using their copy of the card's key. Since no-one else has the key, a valid cryptogram must originate with the card, and the verification of the PIN by the card demonstrates the card is still in the possession of the original cardholder.

CAP Overview

A special class of transactions is known as 'card not present' (CNP) transactions. These include mail order, telephone order and web-based e-commerce transactions. In these cases, payment is authorised by the issuing bank based simply on the visible card details such as the card number and expiry date. Since these values are static in nature and easily copied, CNP transactions are an attractive target for fraud.

MasterCard, together with a number of other organisations in the card industry, has developed a standard to allow the security of Chip and PIN cards to be leveraged in CNP scenarios. This scheme is called the Chip Authentication Program (CAP).

CAP requires that each cardholder be issued with a small, hand-held card reader. By inserting their card into their reader, and entering their PIN, the cardholder can generate an OTP based on the key and ATC on the card. The issuer can verify the OTP by re-computing the cryptogram based on the same input data and key.

Note that the card reader is not personal to the cardholder in any way, and does not perform security-critical operations.

EMV CAP OTP Computation

Chip and PIN chip-cards were designed for use at point-of-sale payment terminals and ATMs, not specifically for one-time-password generation. CAP readers simulate EMV payment terminals in their interaction with the card, and the reader is then responsible for taking the payment cryptogram produced by the card and converting it into a one-time-password.

The processing carried out by the CAP reader is specified in detail in [Chip Authentication Program Function Architecture], but in summary it comprises the following stages:

1. Collecting cryptogram input data
2. Extracting OTP data
3. Decimalisation

Each step is explained in further detail below.

Collecting Cryptogram Input Data

The two principal inputs to the cryptogram computation process are the card key and the ATC. However, with EMV, there are a number of other parameters that are used as inputs into the cryptogram validation. These are specific to card payments, and do not have equivalents in other types of token. In order to reproduce the cryptogram, the validation server must use identical values for these parameters.

In a typical CAP scenario, most of these parameters are either fixed in value when the card is issued, or can be predicted by the validation server. However, a small number of the parameters may change during the card's lifecycle, according to how the card is used. For example, this includes parameters which limit the number or amount of the transactions that the card will authorise off-line. Since the validation server cannot predict these values, they must be transmitted from the card to the server, embedded in the one-time-password itself.

Extracting OTP Data

In order to as user-friendly as possible, the one-time-password produced should be as short as possible, whilst maintaining a reasonable level of security. Since the EMV cryptogram input data, combined with the cryptogram itself, is far too large to be included in the one-time-password in its entirety, it is compressed.

The compression process is defined by a CAP-specific field on the card, known as the Issuer Proprietary Bitmap (IPB), but the process itself is carried out by the card reader. The IPB defines which bits from the ATC, cryptogram and other EMV input data will be used in the one-time-password—the other bits are discarded.

Typically, a small number of ATC bits are included, to assist with synchronisation of counter values between server and card, together with at least 16 bits of the cryptogram, and finally those additional cryptogram inputs that cannot be predicted by the server. In some cases, where the card application is used for CAP only and not for payment, it may be that all additional inputs can be predicted by the server and so the OTP is based on the ATC and cryptogram alone.

Decimalisation

Finally, the binary output from the compression process is decimalised for display to the user on the reader screen. A number of decimalisation schemes are possible, but CAP defines a single scheme based on simply interpreting the truncation process output as the binary representation of a single integer. Leading zeros are ignored, and so the final length of the OTP can vary.

Next we describe the Open Authentication Standards (OATH).

Overview

The Initiative for Open Authentication (OATH) is an industry coordinating body seeking to promote the standardisation of the token-based authentication marketplace. OATH has published a 'reference architecture' describing a vision of a general authentication framework, and is promoting a number of standards for the various interfaces and components within this system.

Most interesting to this application is 'HOTP: An HMAC-based one-time-password algorithm', which is being standardised by the IETF as RFC4226 [HOTP: An HMAC-Based One-Time Password Algorithm, http://www_ietf_org/rfc/rfc4226.txt, December 2005].

HOTP Computation

As with CAP, the HOTP algorithm is based on an underlying cryptographic primitive, in this case HMAC-SHA1. The inputs to this algorithm defined in HOTP are a token key and a counter—very similar to the basic inputs to an EMV cryptogram computation as used by CAP.

The HOTP computation process is as follows:

1. HMAC computation, based on the token key and counter. The counter is then automatically incremented.
2. 'Dynamic Truncation' of the result to give a 31-bit value.
3. Decimalisation of the truncated value, to give the OTP.

Whilst the parallels with the CAP OTP computation are clear, it is important to note that the details of each stage are entirely different. Each step is described and contrasted with its CAP equivalent below.

HMAC Computation

The HMAC computation used is as specified in [HMAC: Keyed Hashing for Message Authentication, RFC2104, http://www_ietf_org/rfc/rfc2104.txt, February 1997], using SHA1 as the underlying hash algorithm [US Secure Hash Algorithm 1 (SHA1), RFC3174, http://www_ietf_orgrfc/rfc3174.txt, September 2001]. The key required by HMAC-SHA1 is typically 20 bytes in length, and [HOTP] specifies that an 8-byte counter is used as the only HMAC input data.

The result is a 20-byte binary value, compared to the 8-byte cryptogram used by CAP. In both cases, a principal objective is that it should not be feasible to recover information about the key from the resulting OTPs. This is the reason why, in both cases, a cryptographic algorithm of some sort is employed.

Dynamic Truncation

The truncation process defined by [HOTP] reduces the 20-byte HMAC output to a 31-bit string.

Firstly, the last 4 bits of the last byte of the HMAC output are considered as an integer n in the range 0-15. Then, bytes n, n+1, . . . , n+3 are used as the truncation output (with the leading bit ignored).

The differences with the compression scheme used by CAP are marked:

- The CAP IPB always selects bits from the same position in the EMV cryptogram for use in the OTP. In OATH, the position of the bits varies, determined by the last 4 bits in the HMAC output, hence the term 'dynamic'.
- The current edition of [HOTP] provides no mechanism for embedding counter synchronisation information in the resulting OTP, whereas the CAP IPB can specify an arbitrary number of ATC bits for inclusion in the OTP.
- The CAP IPB can specify a number of other, EMV-specific data elements for inclusion in the OTP. No such facility is relevant for HOTP.

Decimalisation

HOTP decimalisation consists of interpreting the 31-bit output from the dynamic truncation process as the binary representation of an integer, and then reducing that integer modulo $10^d$, where d is the number of digits desired in the resulting OTP. In contrast with CAP, if the result has fewer than d digits then leading zeros are inserted to give a total OTP length d.

Note also that this decimalisation process actually performs an additional truncation, in the sense that the output has a smaller information content than the input. In CAP, no information is lost during decimalisation.

Figure 3:
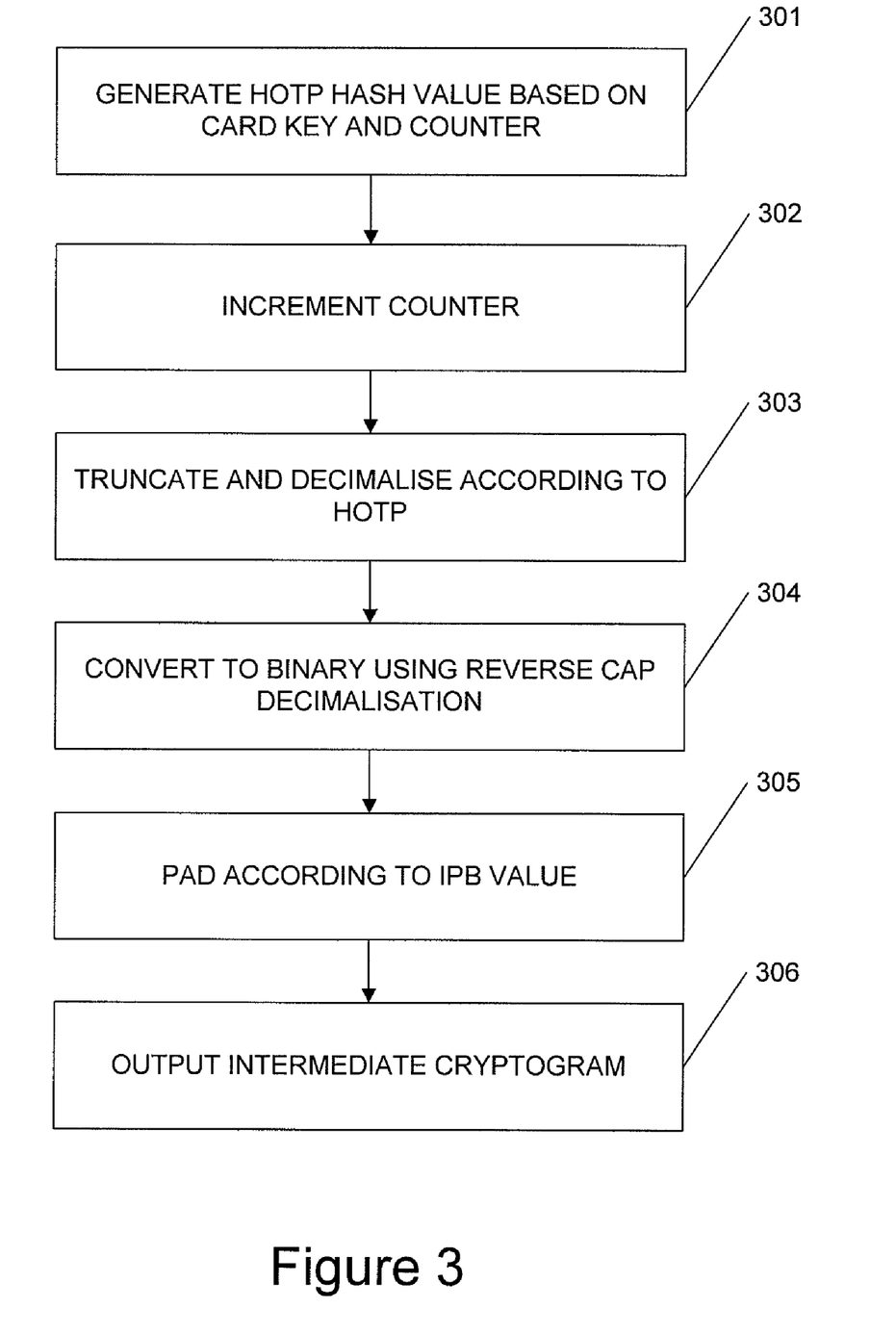
FIG. 3 shows a flowchart of a method according to an embodiment of the invention.

We will now describe generating OATH OTPs using a CAP Reader. FIG. 3 shows an example of a method to achieve this.

We describe a means to generate OATH-compatible OTPs using a standard, unmodified CAP reader, by producing a special OATH chip-card to use within that reader. This allows an organisation wishing to deploy OATH to deploy low-cost chip-cards instead of higher-cost tokens, exploiting the deployed CAP card-reader infrastructure to use these chip-cards with existing, off-the-shelf OATH validation servers.

Clearly the OATH chip-card reproduces the EMV card interface, or at least those parts of the EMV interface that are used by the CAP reader. Otherwise, the reader would reject the card.

The critical card function call is the GENERATE_AC call that is used to generate the cryptogram itself. Note that it does not suffice to simply replace the implementation of this function in the card with a function that generates a HOTP hash value, as used in the computation of OATH OTPs. This is because the process of compressing and decimalising the cryptogram to give the OTP is carried out in the reader, and is entirely different between CAP and OATH.

The OATH chip-card therefore implements the following sequence of operations:
1. Generate the HOTP hash value (301), based on the card key and counter, and increment the counter (302).
2. Truncate and decimalise the hash value (303) to produce the OTP itself.
3. Convert the OTP back into a binary format (304), using a process that is the reverse of the decimalisation process employed by a CAP reader.
4. Pad the resulting binary data (305) in a manner that is the reverse of the compression process employed by a CAP reader (as defined by the IPB value on the card).

Figure 4:
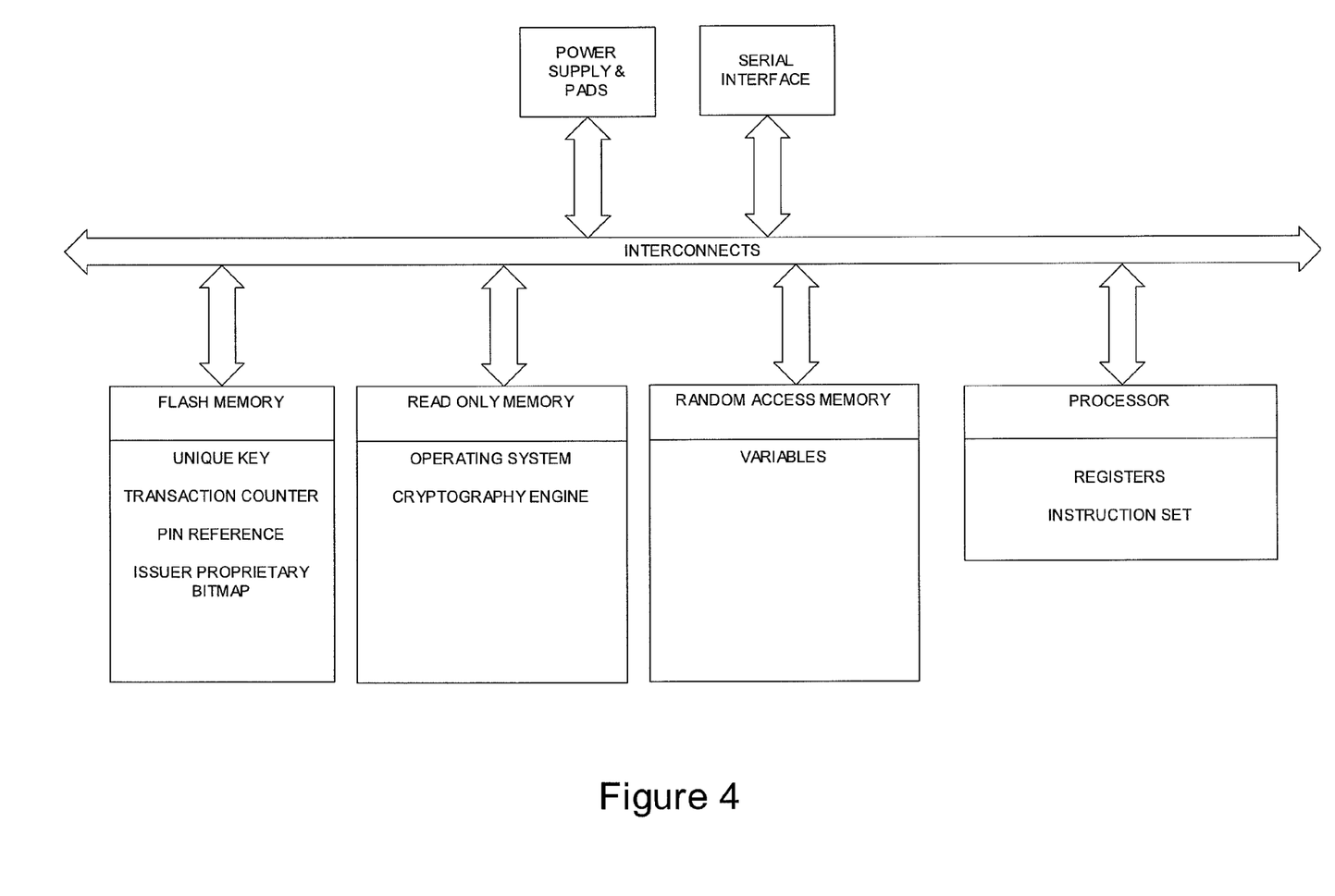
FIG. 4 shows a block diagram of a device according to an embodiment of the invention.

We call the result an intermediate cryptogram. The OATH chip-card passes this intermediate cryptogram to the CAP reader, as if it were a normal EMV cryptogram. The CAP reader will then compress and decimalise the data, effectively reversing steps 4 and 3 above, and thus the end result displayed on the reader screen will be the OATH OTP, as computed by the OATH card at step 2 above. FIG. 4 shows a block diagram of an example of a device for an OATH chip-card compatible with CAP readers.

Special Cases

A number of special cases arise, which are considered as follows.

Leading Zeros

During decimalisation, both CAP and HOTP may result in a decimal result beginning with '0'. CAP specifies that such leading zeros be removed (and so the resulting OTP may vary in length), whereas HOTP specifies that they be included in the OTP (which therefore has fixed length).

Note that in CAP, the decimalisation process—including truncation of leading zeros—takes place in the reader. Thus it is not possible to force a CAP reader to display a HOTP OTP that includes leading zeros, regardless of the method used in the chip-card. We present three possible solutions to this problem:

1. The first possible solution is simple, but unsatisfactory: instruct users to insert additional zeros ahead of the displayed OTP when it is below the expected length.
2. The second possible is to have the authenticating application or validation server insert any missing leading zeros automatically before validating the OTP. This gives a better user experience, but defeats the original objective of implementing OATH using CAP readers without any changes to the validation infrastructure.
3. The third approach is for the OATH chip-card to identify such cases, and when they occur, to automatically discard the OTP (at step 2 above), and generate a new OTP based on the incremented counter value.

Since the leading digit is effectively random, a long sequence of passwords all beginning with zero is highly unlikely. Moreover, since the validation server in any case accepts a range of counter values in order to avoid synchronisation problems, omitting the occasional password because it begins with a zero does not cause validation to fail, and is unnoticed by the user. Lastly, whilst this technique does reduce the number of possible HOTP outputs by some 10%, a 6-digit minimum length gives at least 1 million possible OTPs and so the overall security offered is still entirely acceptable.

Counter Synchronisation Digits

At present HOTP does not specify any means of including counter synchronisation digits in the OTP, whereas CAP offers a flexible scheme, configured using the IPB embedded in the card. By simply suppressing the CAP synchronisation digits with an appropriate IPB value, compatibility can be attained.

Consider the possibility that a future version of HOTP may include a means of including counter synchronisation information in the OTP. It is highly likely that the algorithm chosen would not be compatible with that used by CAP, since there is no analogue to the CAP IPB in HOTP. We remark that compatibility can still be obtained, by continuing to suppress the CAP synchronisation information using the IPB and passing the HOTP synchronisation data from the card to the reader in the intermediate cryptogram, together with the remainder of the OTP.

Now consider the scenario in which the CAP reader includes a mandatory check digit or other synchronisation data, but that HOTP does not. In this case, the reader will receive the cryptogram from the card, and will in addition also receive the ATC value, from which to extract synchronisation data, combining the two to give the displayed OTP. In this case, compatibility can still be maintained, by use of additional card logic. The card should compute the HOTP OTP, and separate it into two parts—that which the reader will extract from the intermediate cryptogram, and that which the reader will extract from the ATC. The card then provides an intermediate cryptogram and an alternative ATC to the reader, knowing that the reader will combine these to reconstruct the original OTP. The key observation is that the reader has no way of knowing that the value in the alternative ATC is not the same as the counter value used to compute the OTP.

Lastly, note that the scenario in which both HOTP and CAP implement synchronisation schemes, but differently, can be handled by a combination of the above techniques.

Check Digits

Check digits are sometimes used to detect errors in data, in particular errors introduced by human transcription. At present, neither CAP nor HOTP includes a check-digit mechanism for the OTPs created, but it is possible that this may change in future.

If a standard CAP reader were required to support a HOTP check digit, this could be achieved by simply embedding the check-digit in the intermediate cryptogram that is passed to the reader, similarly to the technique used to pass synchronisation data discussed above.

Alternatively, suppose the CAP reader were to automatically include a check digit in the OTPs, which HOTP did not specify. This would create a more significant problem, since the card would have no means to suppress such a check digit. The only solutions are to modify the application or validation infrastructure to accept HOTP OTPs with CAP check digits appended, or to have the custom card repeatedly generate OTPs until (by luck) an OTP with a correct check digit is found and an appropriate intermediate cryptogram (which does not include the check digit, since it will be added by the reader) computed.

The latter approach would greatly increase the card computation time, since quite a number of OTPs may have to be calculated before a suitable value is found. The card counter would increment far faster than normal, and the tolerance at the validation server may need to be adjusted accordingly.

Whilst the increase in card counter required is unpredictable, it is likely that an appropriate balance of system parameters (OTP length, validation server tolerance) can still be found offering acceptable security and reliability as long as the amount of error-checking information inserted by the card reader is not too large.

Note that this last technique is a repeat of the technique used to handle leading zeros in the HOTP-based OTP. In general: if the HOTP OTP is incompatible with the card reader for whatever reason (in the above examples, because of a leading zero or check digit), it is always possible for the card to simply increment the card counter value until a compatible OTP is found. The applicability of this technique in practice depends on the number and distribution of incompatible OTPs and the validation server parameters.

We have described the specific scenario of a CAP card reader using a special card to achieve OATH compatibility, and alternatives regarding counter synchronisation and check digits. We now list some further possible applications:

Cards may be provided for use with readers designed for any OTP-based system based on a cryptographic engine separate from the user interface, not just CAP. However, CAP is the most likely system to achieve high volume deployment in the next few years. Cards may be provided for use in any OTP system, not just OATH. Examples include RSA SecureID, VASCO DigiPass, Secure Computing and ActivIdentity. Cards may be provided for challenge-response authentication. Cards may be provided for 'short signatures', in which the token produces an OTP based on message data entered by the user (both still including the counter value, and not). Possible applications include where the CAP reader is replaced by a mobile phone (i.e. a mobile phone with a card reader having enough CAP-compatibility to work with the cards). Other applications include where the OATH card is inserted into a card reader which is connected to the user's PC. Further applications include where the OTP is communicated verbally over the telephone, instead of the Internet, or by mail, or by fax, or over an internal network.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. An apparatus for generating intermediate cryptogram data corresponding to a dynamic password for a first cryptographic scheme, the intermediate cryptogram data being suitable for display using a device designed for a second, incompatible cryptographic scheme for generating a password, the apparatus comprising:
   a communications interface for communicating with a said device; and
   a processor coupled to a memory, the memory storing processor control code to control the processor, when running, to:
   generate a dynamic password according to the first cryptographic scheme; and
   generate intermediate cryptogram data from said dynamic password, the intermediate cryptogram data being suitable for outputting to the said device so that, when the said device processes said intermediate cryptogram data according to the second, incompatible cryptographic scheme to generate a password, the said device outputs said dynamic password generated according to the first cryptographic scheme.

2. An apparatus according to claim 1, wherein the dynamic password comprises a one-time password.

3. An apparatus according to claim 1, wherein the first cryptographic scheme comprises an Open Authentication scheme.

4. An apparatus according to claim 1, wherein the first cryptographic scheme comprises RSA SecureID.

5. An apparatus according to claim 1, wherein the second cryptographic scheme comprises a Chip Authentication Program (CAP) scheme.

6. An apparatus according to claim 1, wherein code to control the processor to generate intermediate cryptogram data comprises code to:
   generate decimal dynamic password data corresponding to said dynamic password;
   generate reverse decimal dynamic password data corresponding to said decimal dynamic password data; and
   pad said reverse decimal dynamic password data to produce said intermediate cryptogram data.

7. An apparatus according to claim 6, wherein code to pad said reverse decimal dynamic password data includes code to insert bits according to a CAP Issuer Proprietary Bitmap.

8. An apparatus according to claim 6, wherein code to pad said reverse decimal dynamic password data includes code to incorporate check digit data corresponding to one or more check digits.

9. An apparatus according to claim 1, wherein a portion of possible dynamic passwords in the first cryptographic scheme cannot be displayed using the said device, and wherein code to generate a dynamic password comprises code to generate dynamic passwords repeatedly until a dynamic password is found which can be displayed using the said device.

10. An apparatus according to claim 9, wherein said portion of possible dynamic passwords comprises dynamic passwords having leading zeros.

11. An apparatus according to claim 9, wherein the said device, when running, generates a check digit for display, and wherein code to generate dynamic passwords further comprises code to determine the check digit generated by the said device.

12. An apparatus according to claim 1, wherein the said device processes synchronisation data in addition to said intermediate cryptogram data, and wherein code to generate intermediate cryptogram data further comprises code to generate synchronisation data for outputting to the said device so that, when the said device processes said synchronisation data and said intermediate cryptogram data according to the second cryptographic scheme, the said device generates data suitable for displaying said dynamic password.

13. An apparatus according to claim 12, wherein said synchronisation data comprises an Application Transaction Counter (ATC).

14. An apparatus according to claim 1, wherein the device comprises a CAP-compatible reader.

15. An integrated circuit including the apparatus of claim 1.

16. A card carrying the integrated circuit of claim 15.

17. A method of generating intermediate cryptogram data corresponding to a cryptogram according to a first cryptographic scheme, the data being suitable for display on a device designed for a second, incompatible cryptographic scheme for generating a password, the method comprising:
   generating, by a computer processor, a dynamic password according to the first cryptographic scheme; and
   generating, by a computer processor, intermediate cryptogram data from said dynamic password, said intermediate cryptogram data being suitable for outputting to a said device so that, when the said device processes said intermediate cryptogram data according to the second, incompatible cryptographic scheme to generate a password, the said device outputs said dynamic password generated according to the first cryptographic scheme.

18. A method according to claim 17, wherein the device comprises a CAP-compatible reader.

19. A method according to claim 17, wherein generating the dynamic password comprises generating an HMAC-SHA1 cryptogram.

20. A method of generating intermediate cryptogram data corresponding to a cryptogram according to a first cryptographic scheme, the data being suitable for display on a device designed for a second, incompatible cryptographic scheme for generating a password, the method comprising:

generating, by a computer processor, a dynamic password according to the first cryptographic scheme;

generating, by a computer processor, intermediate cryptogram data from said dynamic password, such that when a said device processes said intermediate cryptogram data according to the second, incompatible cryptographic scheme to generate a password, the said device outputs said dynamic password generated according to said first cryptographic scheme; and transmitting said intermediate cryptogram data through a communications interface to said device.

21. An apparatus for generating intermediate cryptogram data corresponding to a dynamic password for a first cryptographic scheme, the intermediate cryptogram data being suitable for display using a device designed for a second, incompatible cryptographic scheme for generating a password, the apparatus comprising:

a communications interface for communicating with the device; and a processor coupled to a memory, the memory storing processor control code to control the processor, when executed, to:

generate a dynamic password according to the first cryptographic scheme;

apply a decimalization process to the dynamic password to generate a decimal dynamic password;

apply a reverse decimalization process of the second, incompatible cryptographic scheme to the decimal dynamic password to generate binary data; and apply a reverse compression process of the second, incompatible cryptographic scheme to the binary data to generate intermediate cryptogram data corresponding to the dynamic password, the intermediate cryptogram data being suitable for outputting to the device so that, when the device processes the intermediate cryptogram data according to the second, incompatible cryptographic scheme, the device generates data suitable for displaying the dynamic password.

\* \* \* \* \*

UNITED STATES PATENT AND TRADEMARK OFFICE
CERTIFICATE OF CORRECTION

PATENT NO.         : 7,882,553 B2                                          Page 1 of 1
APPLICATION NO.    : 11/682773
DATED              : February 1, 2011
INVENTOR(S)        : Jonathan Roshan Tuliani It is certified that error appears in the above-identified patent and that said Letters Patent is hereby corrected as shown below:

Column 1, Line 32, change "[http://www_openau-thentication_org]" to
--[http://www.openauthentication.org]--.

Column 5, Line 53, change "http://www_ietf_org/rfc/rfc4226.txt, December 2005]." to
--http://www.ietf.org/rfc/rfc4226.txt, December 2005].--.

Column 6, Line 9, change "http://www_ietf_org/rfc/rfc2104.txt, February 1997]," to
--http://www.ietf.org/rfc/rfc2104.txt, February 1997],--.

Column 6, Line 11, change "http://www_ietf_orgrfc/rfc3174.txt, September 2001]." to
--http://www.ietf.org/rfc/rfc3174.txt, September 2001].--.

Signed and Sealed this
Twenty-fifth Day of October, 2011

David J. Kappos
*Director of the United States Patent and Trademark Office*